Patent 3,082,072

3,082,072
COMBUSTION PROMOTER COMPOSITION AND METHODS OF MAKING AND USING SAME
George H. Smith, 234 Potters Road, Buffalo 20, N.Y.
No Drawing. Filed Dec. 3, 1959, Ser. No. 856,944
7 Claims. (Cl. 44—69)

The present invention is directed to a liquid hydrocarbon combustion promoter composition, the method of preparing the same and to improved liquid hydrocarbon fuels containing the same. More particularly, this invention is directed to a combustion promoter composition and has for an object an improved composition particularly adapted for use with liquid hydrocarbon fuels, particularly those fuels used in internal combustion engines and preferably that type of engine employing an electric spark for igniting the combustible fuel mixture.

It has been found that the combustion promoter composition of the present invention promotes the combustion of any liquid hydrocarbon fuel to full energy release and is particularly effective as an additive to gasolines, both leaded and unleaded, as well as diesel oils. It can be employed to great advantage in unleaded gasolines since it has been indicated that the combustion promoter composition of the invention has some anti-knock properties. It has also been found to be extremely efficient in high octane pure blend gasolines. Because of its effect on combustion velocity, it can be readily employed as an additive to leaded fuels wherein it acts as an accelerator to compensate for flame retarding properties of tetraethyl lead without any adverse effect upon the anti-knock characteristics of the latter.

The combustion promoter composition of this invention comprises a hydrocarbon soluble, water insoluble, normally liquid, neutral, composition of vanadium pentoxide in methyl amyl alcohol hereinafter referred to as 4-methylpentanol-2 containing up to about 2 to 3 weight percent or even higher of vanadium pentoxide based on the weight of the total composition.

This application is a continuation-in-part application of copending application Serial Number 740,515, filed June 9, 1958, and now abandoned, and includes by reference the description set forth in said copending application.

In an advantageous method of preparing the novel combustion promoter composition of this invention, one part by weight of finely powdered vanadium pentoxide (e.g., about 100 mesh) and thirteen parts by weight of 4-methylpentanol-2 are charged to a stainless steel, steam-jacketed kettle equipped with an agitator and a reflux condenser to the upper end of which is connected a glass trap which leads to a collector. The kettle is heated until the alcohol begins to reflux and reflux is continued while gas bubbles through the trap and distillate is removed from the end of the trap. The temperature and rate of flow of cold water circulating through the reflux condenser are maintained at such levels that the gas leaving the reflux condenser and entering the trap is at a temperature of 100° C. or less, permitting water vapors to condense in the trap. The temperature of reflux is approximately 134 to 135° C. under normally prevailing atmospheric pressure conditions. When gas ceases to bubble through the trap, that is, usually after a period of approximately ½ hour, the contents of the kettle are removed and filtered to provide a water-white filtrate and a green residue. Mass balance of materials added and removed as distillate, green residue and filtrate indicate that the filtrate contains from 2 to 3 weight percent of vanadium pentoxide or 30 to 40 weight percent of the vanadium pentoxide originally charged. The distillate removed from the end of the trap represents about 3 to 5 percent of the weight of the vanadium pentoxide and alcohol originally charged to the kettle and is strongly alkaline, smelling distinctly of ammonia.

The relative amounts of the starting materials employed, that is, vanadium pentoxide and methyl amyl alcohol (4-methylpentanol-2), in preparing the combustion promoter composition of this invention can be varied over a wide range and is not limited to the specific preparation set forth above. However, when an excess of 4-methylpentanol-2 is used, a weaker reaction mixture is produced so that more combustion promoter composition should be used in the gasoline in order to accomplish the desired combustion efficiency.

When carrying out the method of the invention, it is necessary that all water be removed as well as other impurities which may be contained in the vanadium pentoxide and/or 4-methylpentanol-2. For this reason, temperature and rate of flow of cold water circulating through the condenser are maintained at such temperatures and flow rates that the water vapors and other low boilers are condensed in the trap.

Additionally, it has been observed that regardless of the relative ratios and/or amounts of starting materials initially charged to the kettle, a reflux time of about one-half hour is usually sufficient in order to produce a combustion promoter composition adapted to achieve the objects of the invention.

The above described composition is preferably present in gasoline in an amount, which, by volume, is about 1 oz. per five gallons. In diesel fuel the amount, by volume, of the composition is preferably about 1 oz. per 10 gallons. Substantially more or less than these amounts can be advantageously employed, although these approximate amounts have been found to provide efficiently and economy. If lesser amounts are employed, the time elapsed before complete carbon removal from a used engine is attained, for example, is greater, whereas if larger amounts are employed, the time for complete carbon removal is shortened.

Without wishing to be bound by any particular theory or explanation, it is believed that the combustion promoter composition of this invention readily reacts in the combustion chamber to yield a catalyst in an extremely fine and very active form. In this condition, it becomes very highly dispersed in the air-fuel mixture and deposits in a fine film on the wall of the combustion chamber, the piston heads, valves and valve seats so that any pits, scratches or other defects are filled to produce a smooth surface.

Among the many advantages achieved through the use of the combustion promoter composition of the invention are, to name a few, greater compression and power with the resultant improvement in fuel and oil economy, smoother operation and increased milage. One of the most important advantages derived through the use of the aforesaid composition is the substantially complete elimination of poison exhaust gases. For example, analysis of exhaust fumes, made by an independent group, from an engine burning a conventional gasoline containing the combustion promoter composition of the invention shows an average of 0.0 percent carbon monoxide for four tests at an engine speed of about 50 miles per hour. In comparative tests by another independent group, a used high compression engine was run for 22 minutes on untreated low test gas. When visually observed, the motor ran roughly; however, when run on the same gasoline containing the combustion promoter composition of this invention, the motor quieted down and ran smoothly. Horsepower measurements from 10 to 13 miles per hour increased from 43 to 48. Visual observation indicated no fumes from the exhaust. Another important advantage is the apparent reconditioning of used engines by the removal of carbon deposits from the combustion chamber, pistons, rings, spark plugs and valves. Repeated tests have shown that engines with heavy carbon deposits after being operated with the novel compositions of this invention, are either free of carbon deposits or the amount of carbon deposits is greatly reduced. It appears that with any given composition, the longer the period of use, the greater the reduction in carbon deposits.

The combustion promoter composition of the invention is compatible with conventional hydrocarbon fuels containing other additives such as tetraethyl lead, tricresyl phosphate, trialkyl phosphines and the like, and can be used as the sole combustion promoter for untreated gasolines and diesel fuels or in conjunction with other combustion promoters of treated gasolines and diesel fuels.

Although vanadium oxides have heretofore been employed in the art for various purposes, they are mostly in the form of vanadium salts of acids which are acid in nature. Other forms of vanadium oxides as solutions in acids and water-soluble alcohols and even other water-insoluble alcohols or as alcoholates, although known, are unsuitable apparently because under conditions of use the vanadium oxide decomposes to a corrosive form of the oxide in the combustion chamber and attacks the walls of said chamber, as well as depositing undesired deposits of solid material in the fuel system and/or combustion chamber. As is known, abnormal combustion is generally attributed to the buildup of these deposits in the combustion chamber. The composition of the present invention is unique, however, in many respects, namely, the use of 4-methylpentanol-2 as distinguished from other alcohols provides a composition of vanadium pentoxide in said 4-methylpentanol-2 which is neutral, neither alkaline or acid; is soluble in liquid hydrocarbon fuels such as gasolines and diesel oils; is substantially insoluble in water; which when burned in the combustion chamber is non-corrosive and does not cause abnormal combustion due to excessive deposits in the combustion chamber as well as causing complete combustion of carbon and substantially complete elimination of carbon monoxide in the exhaust gases. Additionally, when the combustion promoter composition of the present invention is employed in engines of the spark ignition type, the composition reduces pre-ignition by so-called surface or depoist induced ignitions ahead of the desired spark ignition.

What is claimed is:

1. A combustion promoter for liquid hydrocarbon fuels comprising the filtrate obtained by refluxing about 1 part vanadium pentoxide and about 13 parts 4-methylpentanol-2 while removing water of reaction, and filtering the resulting residual reaction mixture to remove solids, said filtrate containing a composition of vanadium pentoxide and 4-methylpentanol-2 in an amount sufficient to improve the combustion efficiency of said fuel when said filtrate is mixed with a major proportion of said fuel.

2. A combustion promoter composition for liquid hydrocarbon fuels comprising the filtrate obtained by refluxing a mixture of 4-methylpentanol-2 and vanadium pentoxide and filtering the resulting residue to remove solids, said filtrate containing an equivalent of from about 2 to 3 weight percent vanadium pentoxide, based on the total weight of said composition.

3. A fuel comprising a major proportion of a liquid hydrocarbon fuel having a boiling point in the range from about 100° F. to about 600° F. and a combustion promoter comprising the filtrate obtained by refluxing about 1 part vanadium pentoxide and about 13 parts 4-methylpentanol-2 while removing water of reaction and filtering the resulting residual reaction mixture to remove solids, said filtrate containing a composition of vanadium pentoxide and 4-methylpentanol-2 in an amount sufficient to improve the combustion efficiency of said fuel when said filtrate is mixed with a major proportion of said fuel, and said combustion promoter being in an amount sufficient to promote the combustion efficiency of said liquid hydrocarbon fuel.

4. A fuel comprising a major proportion of a liquid hydrocarbon fuel having a boiling point in the range from about 100° F. to about 600° F. and a combustion promoter comprising the filtrate obtained by refluxing vanadium pentoxide and 4-methylpentanol-2 and filtering the resulting residue to remove solids, said filtrate containing an equivalent of from 2 to 3 weight percent of vanadium pentoxide based on the total weight of said filtrate, said combustion promoter being present in said liquid hydrocarbon fuel in an amount sufficient to improve the combustion efficiency of said liquid hydrocarbon fuel.

5. A fuel comprising a major proportion of gasoline and a minor proportion of a combustion promoter obtained by refluxing about 1 part vanadium pentoxide and about 13 parts 4-methylpentanol-2 while removing water of reaction, said combustion promoter being present in said gasoline in an amount sufficient to improve the combustion efficiency of said gasoline.

6. The fuel as claimed in claim 5, wherein said gasoline is unleaded.

7. A fuel as claimed in claim 5, wherein said gasoline is leaded.

References Cited in the file of this patent
UNITED STATES PATENTS

| | | |
|---|---|---|
| 1,133,961 | Hess | Mar. 30, 1915 |
| 1,534,573 | Riboisiere | Apr. 21, 1925 |
| 1,973,320 | Pacyna | Sept. 11, 1934 |
| 1,980,097 | Ruddies | Nov. 6, 1934 |
| 2,135,111 | Prebluda | Nov. 1, 1938 |
| 2,156,918 | Lyons | May 2, 1939 |
| 2,220,041 | Hill | Oct. 29, 1940 |
| 2,257,009 | Hill | Sept. 23, 1941 |
| 2,460,700 | Lyons | Feb. 1, 1949 |
| 2,560,542 | Bartleson et al. | July 17, 1951 |
| 2,671,758 | Vinograd et al. | Mar. 9, 1954 |

UNITED STATES PATENT OFFICE
CERTIFICATE OF CORRECTION

Patent No. 3,082,072                                                March 19, 1963

George H. Smith

It is hereby certified that error appears in the above numbered patent requiring correction and that the said Letters Patent should read as corrected below.

In the grant, lines 1 to 3, for "George H. Smith, of Buffalo, New York," read -- George H. Smith, of Buffalo, New York, assignor to Ellsworth C. Ledbetter, of Orchard Lake, Michigan, --; line 12, for "George H. Smith, his heirs" read -- Ellsworth C. Ledbetter, his heirs --; in the heading to the printed specification, line 4, for "George H. Smith, 234 Pott. Road, Buffalo 20, N. Y." read -- George H. Smith, Buffalo, N. Y., assignor to Ellsworth C. Ledbetter, Orchard Lake, Mich --; column 2, line 33, for "efficiently" read -- efficiency --; line 53, for "milage" read -- mileage --; column 3, line 43, for "depoist" read -- deposit --.

Signed and sealed this 3rd day of December 1963.

(SEAL)
Attest:
ERNEST W. SWIDER

Attesting Officer                                    EDWIN L. REYNOLD
                                                           Acting Commissioner of
                                                                       Patents